(12) United States Patent
Kalb et al.

(10) Patent No.: US 11,973,402 B2
(45) Date of Patent: Apr. 30, 2024

(54) DRIVE DEVICE HAVING A BRUSHLESS ELECTRIC MOTOR

(71) Applicant: Brose Fahrzeugteile SE & Co. Kommanditgesellschaft, Bamberg, Bamberg (DE)

(72) Inventors: Roland Kalb, Rossach (DE); Gabriele Lange, Marktrodach (DE); Helmut Pfalzgraf, Eibelstadt (DE); Wolfgang Strauß, Unterpleichfeld (DE); Uwe Christian, Marktzeuln (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 272 days.

(21) Appl. No.: 17/602,845

(22) PCT Filed: Apr. 6, 2020

(86) PCT No.: PCT/EP2020/059717
§ 371 (c)(1),
(2) Date: Oct. 11, 2021

(87) PCT Pub. No.: WO2020/207946
PCT Pub. Date: Oct. 15, 2020

(65) Prior Publication Data
US 2022/0149696 A1     May 12, 2022

(30) Foreign Application Priority Data

Apr. 11, 2019 (DE) .................... 10 2019 205 256.8

(51) Int. Cl.
*H02K 7/116* (2006.01)
*H02K 3/52* (2006.01)
*H02K 5/22* (2006.01)

(52) U.S. Cl.
CPC ........... *H02K 7/1166* (2013.01); *H02K 3/522* (2013.01); *H02K 5/225* (2013.01); *H02K 2203/06* (2013.01)

(58) Field of Classification Search
CPC ...... H02K 7/1166; H02K 3/522; H02K 5/225; H02K 2203/06
(Continued)

(56) References Cited

U.S. PATENT DOCUMENTS 6,803,687 B2 * 10/2004 Murakami ........... H02K 11/026
310/71
7,183,682 B2 * 2/2007 Yamashita ............. H02K 5/225
310/83
(Continued)

FOREIGN PATENT DOCUMENTS

CN      108736402 A    11/2018
DE      19924323 C2    5/2002
(Continued)

OTHER PUBLICATIONS

Chinese Office Action for CN Application No. 202080026080.1, dated Apr. 28, 2023, Google English Translation attached to original, All together 18 Pages.
(Continued)

*Primary Examiner* — David Luo
(74) *Attorney, Agent, or Firm* — Dickinson Wright PLLC (57) ABSTRACT

A drive device, in particular an electric-motor adjustment drive of a motor vehicle, comprising a drive housing having a brushless electric motor mounted therein, the electric motor having a stator having a stator winding and a rotor having a rotor shaft, the rotor shaft being coupled to a transmission mechanism. The drive housing has a transmission mechanism housing and a motor housing, which is connected to the transmission mechanism housing at a
(Continued)

connection interface. A plug connection for receiving a mating plug connection is provided on the motor housing or on the transmission mechanism housing, the plug connection having a number of connection contacts. A number of phase connections of the stator winding is led into a joining and/or contacting position. The phase connections are led, for the electrical contacting thereof, to the connection contacts of the plug connection.

19 Claims, 10 Drawing Sheets

(58) Field of Classification Search
USPC .................................................. 318/15, 9, 3
See application file for complete search history.

(56) References Cited

U.S. PATENT DOCUMENTS

| | | | |
|---|---|---|---|
| 7,517,257 B2 * | 4/2009 | Handwerker | H02K 5/225 |
| | | | 439/221 |
| 9,431,867 B2 * | 8/2016 | Tamura | H02K 5/225 |
| 9,882,294 B1 | 1/2018 | Jeong et al. | |
| 10,451,154 B2 | 10/2019 | Kouno et al. | |
| 10,717,401 B2 | 7/2020 | Skalski | |
| 2014/0373658 A1 | 12/2014 | Tamaki et al. | |
| 2017/0126092 A1 | 5/2017 | Han | |
| 2017/0222377 A1 | 8/2017 | Sakurada | |
| 2017/0237185 A1 | 8/2017 | Tamura et al. | |
| 2020/0021160 A1 | 1/2020 | Kuratani et al. | |

FOREIGN PATENT DOCUMENTS

| | | |
|---|---|---|
| DE | 102011121716 B3 | 2/2013 |
| DE | 112012001467 T5 | 1/2014 |
| DE | 102014118105 A1 | 6/2016 |
| DE | 102017107195 A1 | 10/2017 |
| DE | 112016002743 T5 | 3/2018 |
| EP | 2784914 B1 | 7/2017 |
| EP | 2244357 B1 | 11/2017 |
| EP | 3292590 A1 | 3/2018 |
| EP | 3316453 A1 | 5/2018 |
| EP | 3292590 A1 | 3/2019 |
| FR | 2942083 A1 | 8/2010 |
| JP | 2004040853 A | 2/2004 |
| JP | 2008182834 A | 8/2008 |
| JP | 2009100487 A | 5/2009 |
| JP | 2010093943 A | 4/2010 |
| KR | 101333839 B1 | 11/2013 |
| WO | 2013065577 A1 | 5/2013 |
| WO | 2018150968 A1 | 8/2018 |
| WO | 2019009132 A1 | 1/2019 |

OTHER PUBLICATIONS

Chinese Office Action for CN 202080026080.1, Google Machine Translation attached to original dated Jan. 24, 2024, All together 20 Pages.

* cited by examiner

DRIVE DEVICE HAVING A BRUSHLESS ELECTRIC MOTOR

CROSS-REFERENCE TO RELATED APPLICATIONS

This application is the U.S. National Phase of PCT Application No. PCT/EP2020/059717 filed on Apr. 6, 2020, which claims priority to German Patent Application No. DE 10 2019 205 256.8, filed on Apr. 11, 2019, the disclosures of which are hereby incorporated in their entirety by reference herein.

TECHNICAL FIELD

The present disclosure relates to a drive device, such as an electromotive adjustment drive of a motor vehicle.

BACKGROUND

A drive device which, for example, as an electromotive adjustment drive of a motor vehicle, drives an actuating element between two end positions along an adjustment path usually comprises an electric motor and a transmission, coupled thereto, which is arranged in a transmission housing. The transmission housing is usually connected to a motor housing, accommodating the stator and the rotor of the electric motor, via a flange-like attachment, wherein the electric motor is typically an internal-rotor commutator motor with brushes. Drive devices of this type, such as window-lift drives, are potentially exposed to extreme moisture and high temperature fluctuations at the designated installation location.

SUMMARY

One or more objects of the present disclosure may be to provide a drive device with an improved connection design for the phase terminals of a brushless electric motor with a motor electronics system provided outside the drive housing.

A drive device according to one or more embodiments, may be for use in an electromotive adjustment drive of a motor vehicle, and may include a drive housing with a brushless electric motor which is or can be mounted therein. The electric motor may include a stator with a rotating field winding (stator winding) and a permanently excited rotor with a rotor shaft which is or can be coupled thereto.

The stator of the electric motor may include a stator base body with a number of stator teeth which are arranged in a star shape and around which the stator winding is wound. The stator base body may include external teeth and may include a suitable central shaft passage for the rotor shaft. In this embodiment of the electric motor, the rotor may include a rotor housing, surrounding the stator base body and coupled to the rotor shaft, with permanent magnets arranged therein. The stator-side rotating field winding may include a number of phase terminals which are the winding or wire ends of single, double, or multiple coils of the rotating field winding.

The electric motor and the transmission are advantageously arranged in each case in a housing, namely a motor housing and in a transmission housing. The housing and the motor housing can be connected to each other, such as detachably, for example, by means of a flange connection. The connection (connection point) between the transmission housing and the motor housing is referred to below as the connection interface.

A plug terminal, which is provided and configured to receive a mating plug terminal and may include a number of terminal contacts, is arranged on the motor housing or on the transmission housing. The, for example, six (6) phase terminals of the stator winding are led into a joining and/or contacting position. For this purpose, the winding or wire ends of the single, double, or multiple coils of the rotating field winding are initially oriented axially in sections in a suitable fashion and are then bent by approximately 90° so that they extend in a radial direction—relative to the axis of rotation of the rotor shaft of the electric motor—and are hence oriented radially.

In other words, the phase terminals are individually pre-bent so that they are suitable for joining and contacting. In this radial orientation, the phase terminals are led for their electrical contacting to the terminal contacts of the plug terminal. They may receive the phase terminals in a precise position. In this connection position, the phase terminals can then be soldered selectively (specifically for the connection) to the terminal contacts of the plug terminal, for example also producing or preparing a star or delta circuit.

In one or more embodiments, the plug terminal may include a plug housing integrally formed on the transmission housing in the region of the connection interface and in which the terminal contacts are received. This embodiment may be advantageous for a plug connection in the radial direction, i.e. in a direction which is radial with respect to the axis of rotation of the rotor shall of the electric motor, for a lateral plugging direction of the mating plug contact into the plug connection with the plug terminal. In this embodiment, the plug housing is at least more or less completely integrally formed on the transmission housing, with the exception of a plate-like housing base which is integrally formed on the motor housing.

In an alternative embodiment, the plug terminal may include a housing part, integrally formed on the motor housing and on the transmission housing in the region of the connection interface, of a plug housing in which the terminal contacts are received. This embodiment is particularly advantageous for a plug connection in the axial direction, i.e. in a plugging direction, which is parallel to the axis of rotation of the rotor shaft of the electric motor, of the mating plug contact into the plug connection with the plug terminal.

According to another embodiment, the terminal contacts may be arranged in a terminal block with an access opening for the phase terminals. In a suitable fashion, the terminal block may include a plug contact side on which terminal pins of the terminal contacts are provided for the plug connection to the mating contact plug. Contact elements of the terminal contacts for connection of the phase terminals are provided on a connection side opposite the plug contact side. The number and arrangement of the terminal contacts of the plug terminal may be configured for interconnection of the phase terminals in a star or delta circuit.

The stator may have a circular cross-section, for example. In another embodiment, the phase terminals extend in a common angular range of 90° parallel to one another and are led in this formation to the terminal contacts of the plug terminal. The terminal contacts of the plug terminal may be arranged outside the stator and arranged or oriented along an (imaginary) tangential line.

BRIEF DESCRIPTION OF THE DRAWINGS

Exemplary embodiments of the invention are explained below with the aid of the drawings, in which.

Mutually corresponding parts are provided in all the drawings with the same reference symbols.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In a drive device, in particular of an electromotive adjustment drive of a motor vehicle, known from DE 10 2011 121 716 B3, the transmission and the electric motor which is designed as an internal rotor are arranged in separate housings. A housing opening, which is covered by means of a gas-permeable and for example a liquid-impermeable membrane, is provided in a housing connection region for the electromotor in order to effect an equalization of the pressure between the inside of the housing and the surroundings or the outside of the housing.

If a brushless electric motor with a stator which has a multi-phase, usually three-phase AC winding is used for such a drive device, the phase terminals need to contact a motor electronics system supplying current to the AC winding. The phase terminals can be electrically connected to the motor electronics system inside the drive device at a printed circuit board on which the electrical and/or electronic components of the motor electronics system are mounted and interconnected. Alternatively, the phase terminals can also be connected to a motor electronics system provided outside the drive device by means of a plug connection (plug-in contacting). Such a plug connection, which generally requires two components (metal parts) in the form of a clamping or blade contact for each of the typically three phases for the respective phase terminal and a mating contact, is relatively intensive in terms of components and space.

Figure 1:
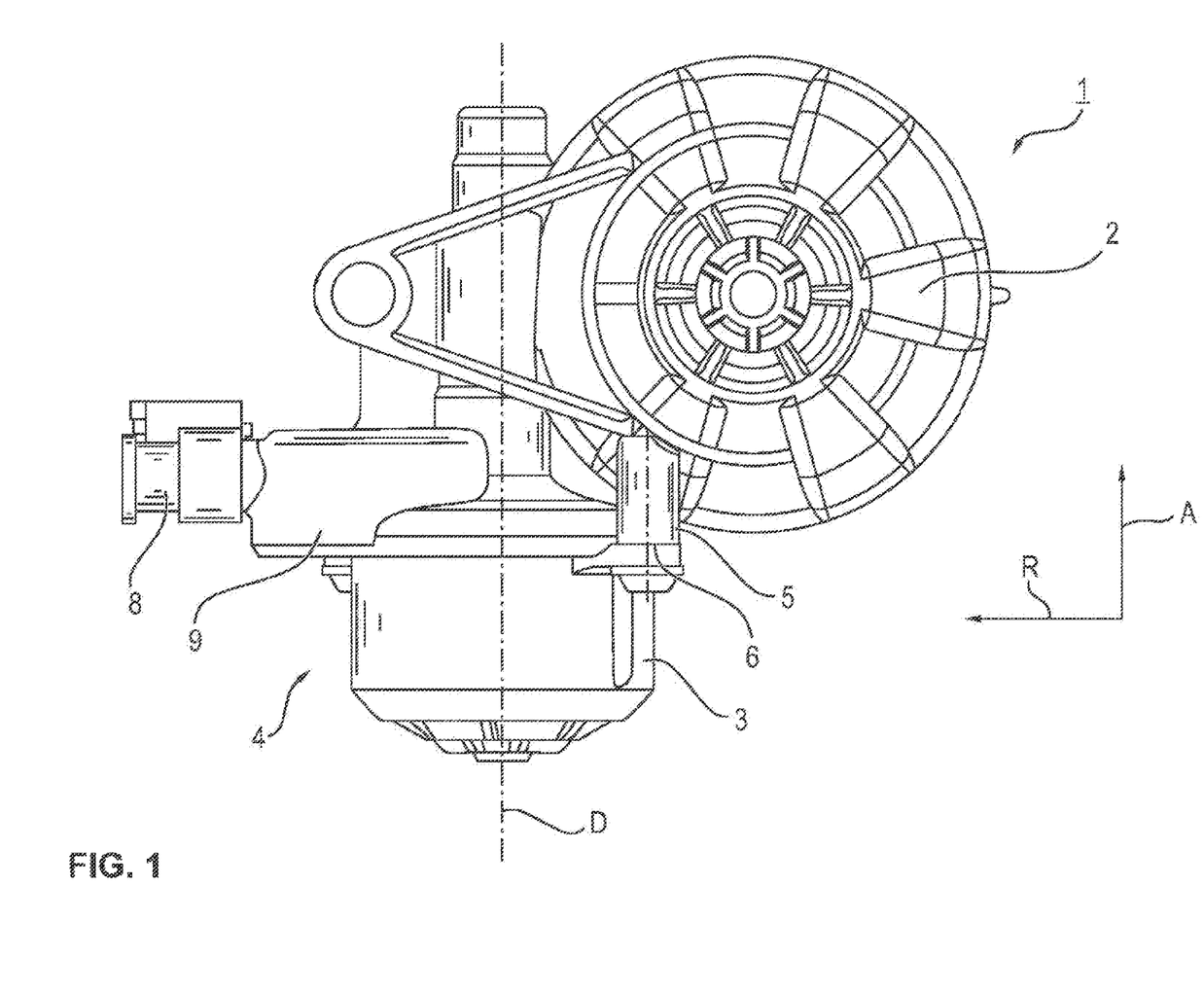
FIG. 1 shows, in a side view, a first alternative embodiment of the drive device with a drive housing, composed of a transmission housing and a motor housing, and an electric motor accommodated therein, and with a plug terminal for a (radial) lateral plugging direction of a mating plug terminal.
Figure 6:
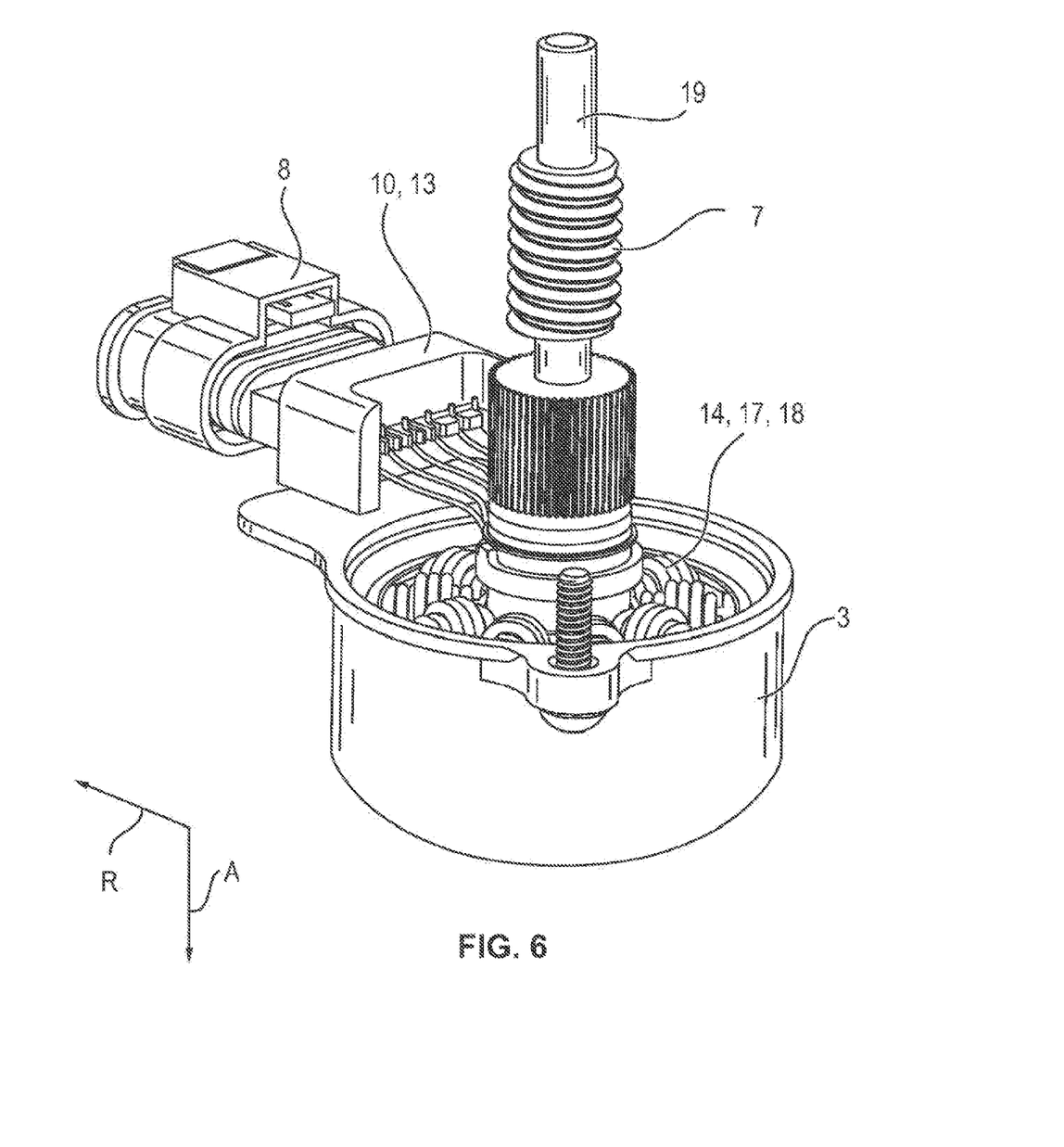
FIG. 6 shows, in a perspective view according to FIG. 5, the drive device with the transmission housing removed, with phase terminals led radially to the terminal contacts on the plug terminal side and phase terminals contacting the latter.
Figure 7:
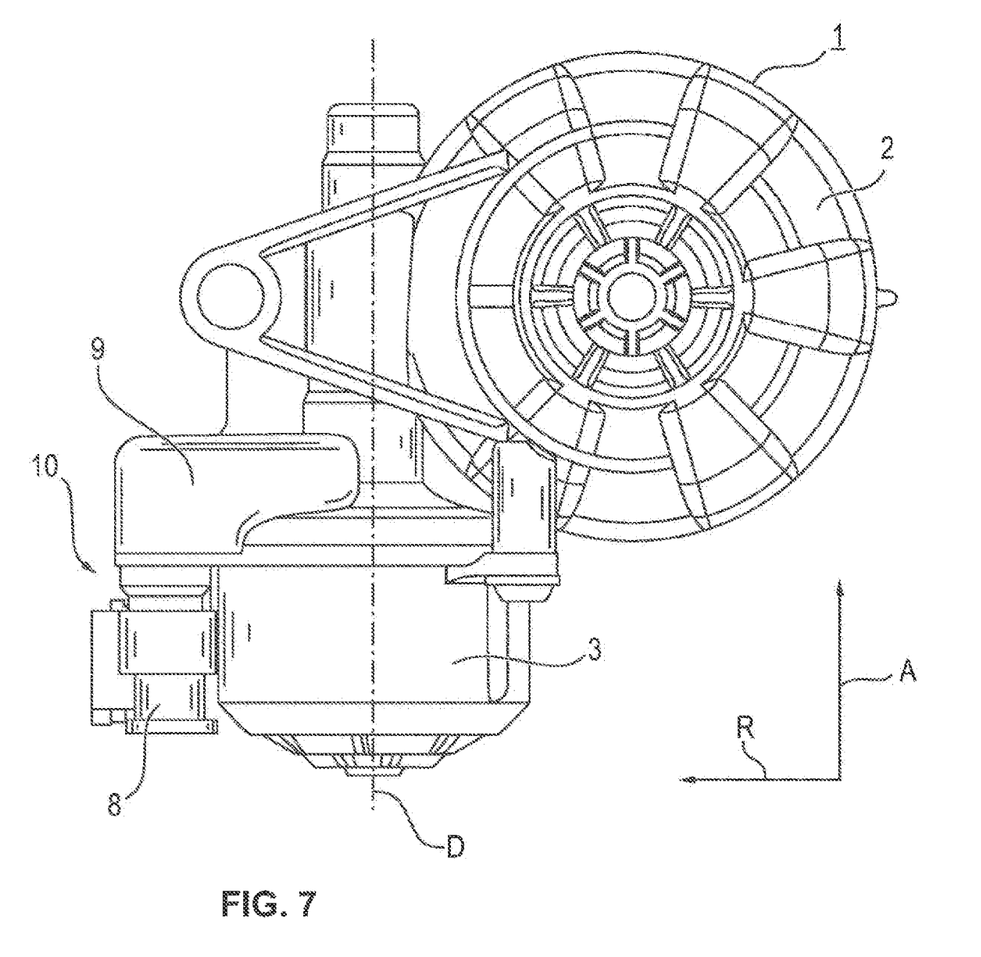
FIG. 7 shows, in a side view, a second alternative embodiment of the drive device with a drive housing, composed of a transmission housing and a motor housing, and an electric motor accommodated therein and with a plug terminal for an (axial) parallel plugging direction of the mating plug terminal.
Figure 8:
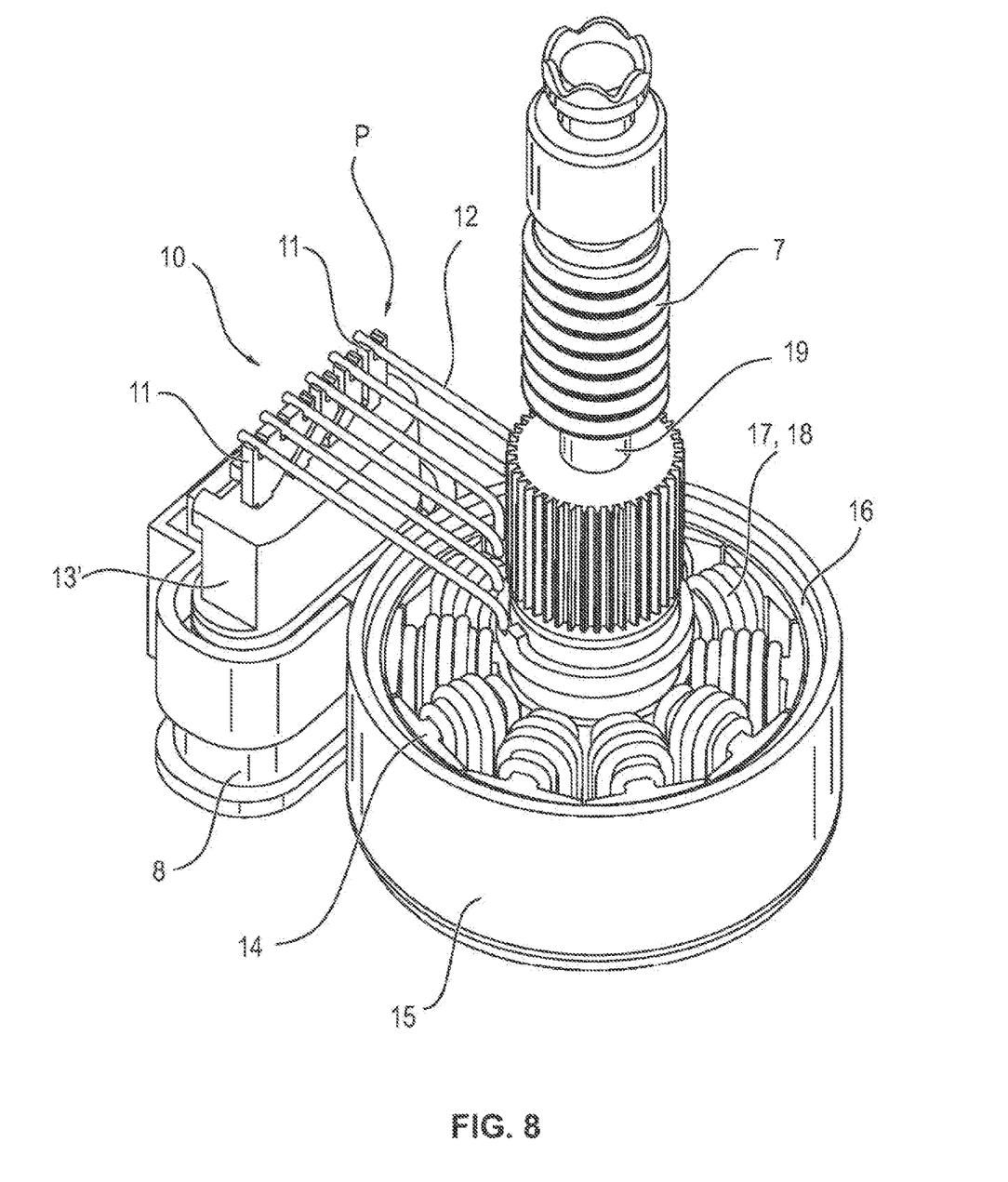
FIG. 8 shows, in a perspective view, the drive device according to FIG. 7 with the transmission and motor housing removed, with a terminal block with phase terminals led radially to its terminal contacts and contacting the latter.
Figure 10:
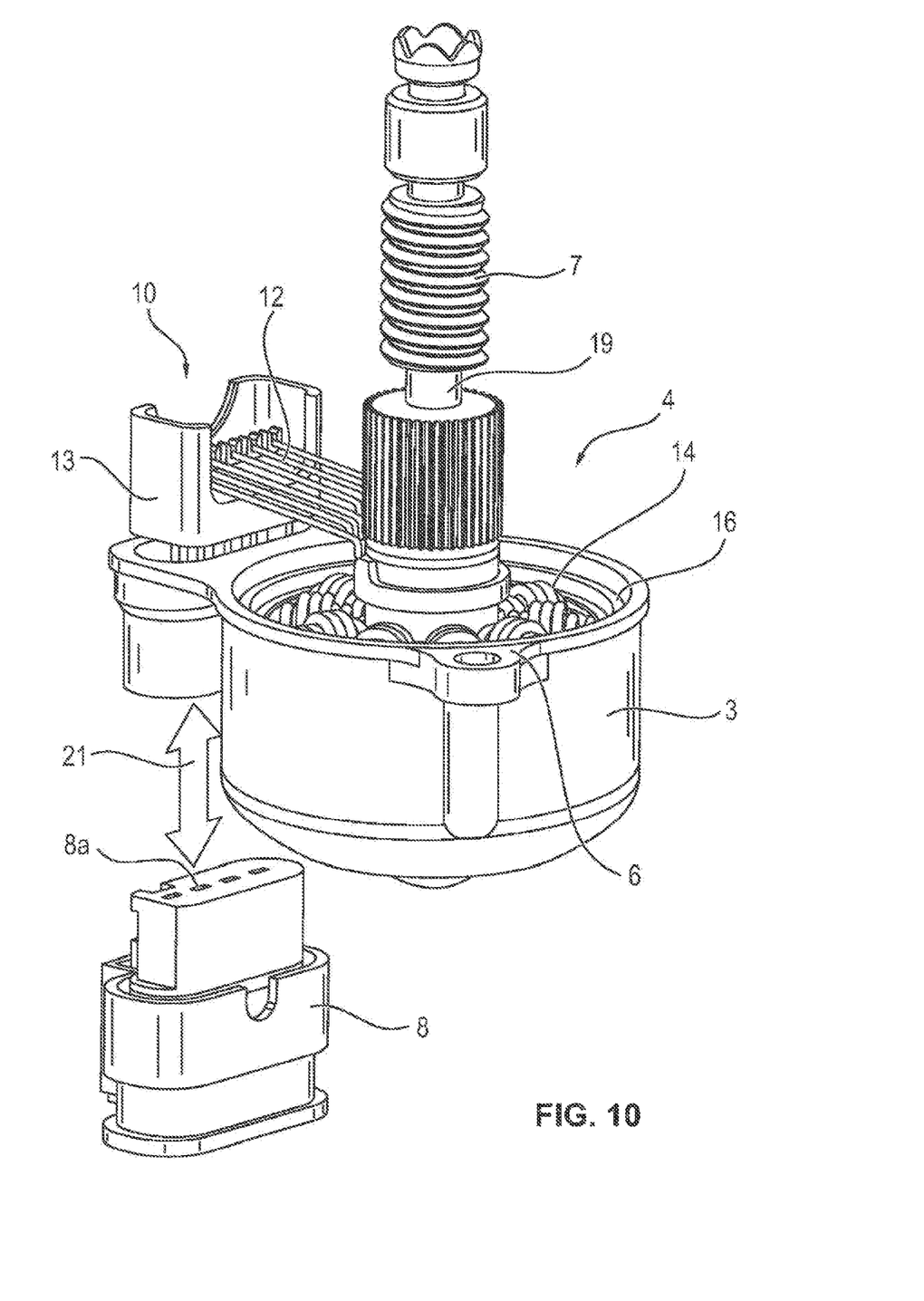
FIG. 10 shows, in a perspective view, the drive device according to FIG. 7 with the transmission housing removed, with an alternative terminal block with phase terminals led radially to its terminal contacts and contacting the latter, and with a mating plug terminal arranged in the plugging direction.

FIG. 1 shows an electromotive drive device 1 with a transmission housing 2 and with a motor housing 3 into which an electric motor 4 is inserted. The transmission housing 2 and the motor housing 3 are connected to each other detachably by means of a flange connection, wherein a mechanical interface (connection interface) 6 is provided in this connection between the transmission housing 2 and the motor housing 3. The electric motor 4 drives a driven element (not shown) via a transmission. The transmission of the drive device 1 is a 90° angle transmission, such as a worm gear transmission, the worm gear (not visible) of which, arranged in the transmission housing 2, drives the driven element via a drive or shaft pin which is a cable drum for a traction cable, for example of a window lift of a motor vehicle. A worm gear 7, rigid with the shaft, of the transmission is illustrated in FIGS. 6, 8, and 10.

A mating plug terminal 8, also referred to below as a terminal plug, leads connection lines (not shown) to a motor electronics system (not shown) for supplying power and voltage to or for controlling the drive device 1 serving as an adjustment drive of the motor vehicle. The mating plug terminal 8 is inserted into a plug housing 9 integrally formed on the transmission housing 2 in the region of the connection interface 6.

Figure 2:
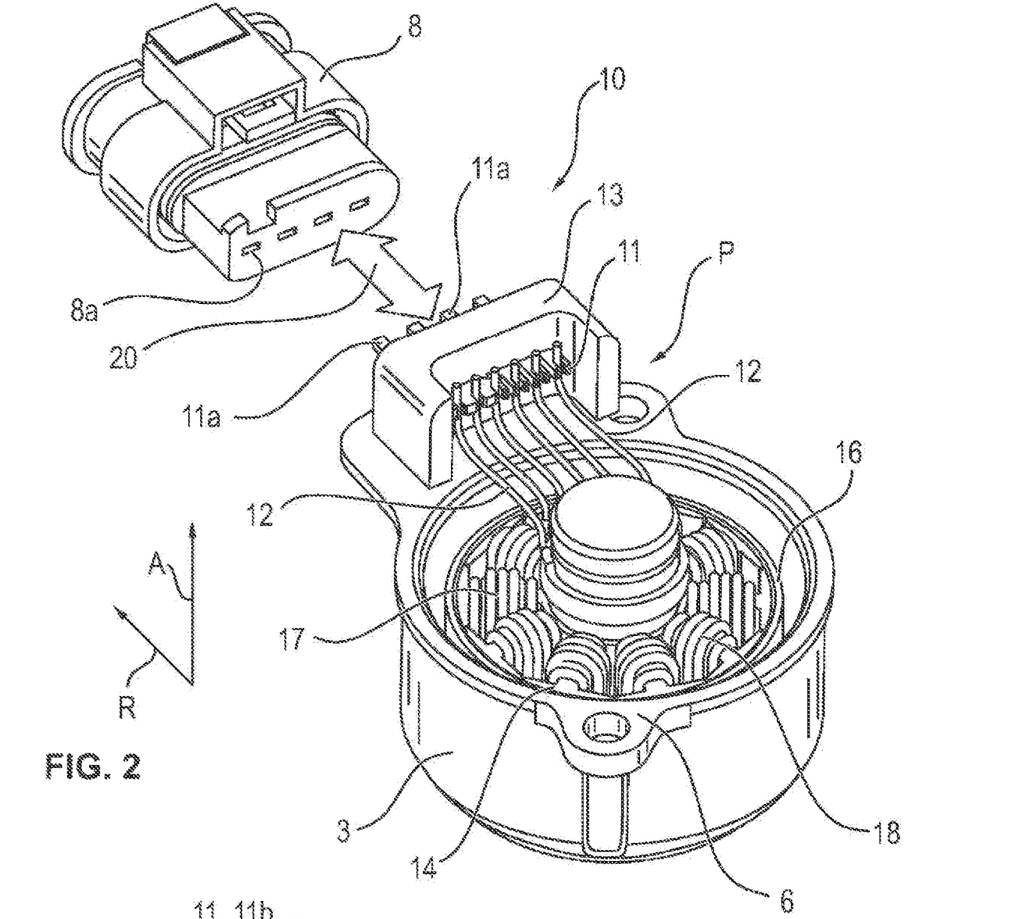
FIG. 2 shows, in a perspective view, the drive device according to FIG. 1 with the transmission housing removed, with a terminal block, on the motor housing side, with terminal contacts, on the plug terminal side, for phase terminals of a stator winding of the electric motor and a mating plug terminal arranged in the plugging direction.

FIG. 2 shows the drive device 1 without the transmission housing 2 with a view of a plug terminal 10 with terminal contacts 11. The terminal contacts 11 are arranged in a terminal block 13 illustrated on an enlarged scale in FIG. 3. For this purpose, the terminal block 13 has an access opening 13c for the phase terminals 12.

The electric motor 14 may be a brushless and may include a stator 14 and rotor 16 which is formed of a rotor housing 15 (FIG. 8) and permanent magnets arranged therein on the inner wall of the housing. The stator 14 or its externally toothed stator base body carries a stator or rotating field winding 17 with a number of coils (single, double, or multiple coils) 18, the winding or wire ends of which are led as phase terminals 12 on the end side, shown in FIG. 2, of the stator 14 in a radial direction R to the plug terminal 10 and there to the terminal contacts 11 and contact the latter.

The axial direction A illustrated in FIGS. 1 and 2 is coaxial to the axis of rotation D of the electric motor 4 or its motor or rotor shaft 19 which is illustrated in FIGS. 6 and 8. The motor and rotor shaft 19, which passes through a central shaft passage of the stator 14, is connected (coupled) to a rotor housing 15 and carries the worm gear 7 of the worm gear transmission, fixed with the shaft.

Figure 3:
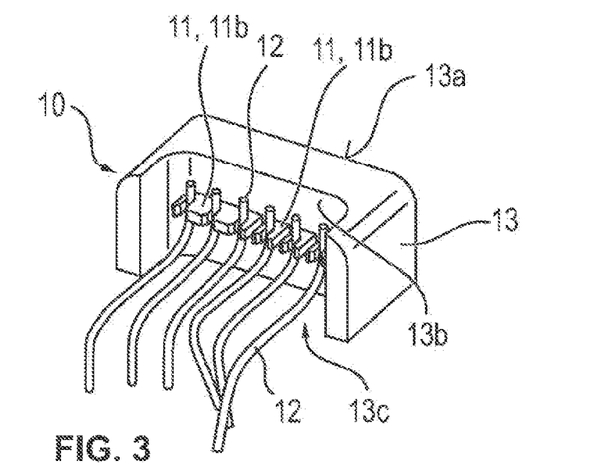
FIG. 3 shows, in a perspective view, the terminal block according to FIG. 2 with terminal contacts on the plug terminal side and phase terminals contacting the latter.

The terminal block 13 of the plug terminal 10 also illustrated on an enlarged scale in FIG. 3 has a plug-in contact side 13a and, opposite it, a connection side 13b which can be accessed via the access opening 13c. Terminal pins 11a of the terminal contacts 11 for the plug connection to the mating contact plug 8 are provided on the plug-in contact side 13a. Contact elements 11b of the terminal contacts 11 are provided on the opposite connection side 13b. Bush-like plug-in sockets 8a of the mating contact plug 8 correspond to the terminal pins 11a of the terminal contacts 11. Received in these are mating contacts (not visible), corresponding to the terminal contacts 11, of the mating plug terminal 8 in a touch- and finger-safe fashion. The plugging direction for the plug connection of the mating contact terminal 8 to the plug terminal 10 is indicated in FIG. 2 by the double-headed arrow 20.

Figure 4:
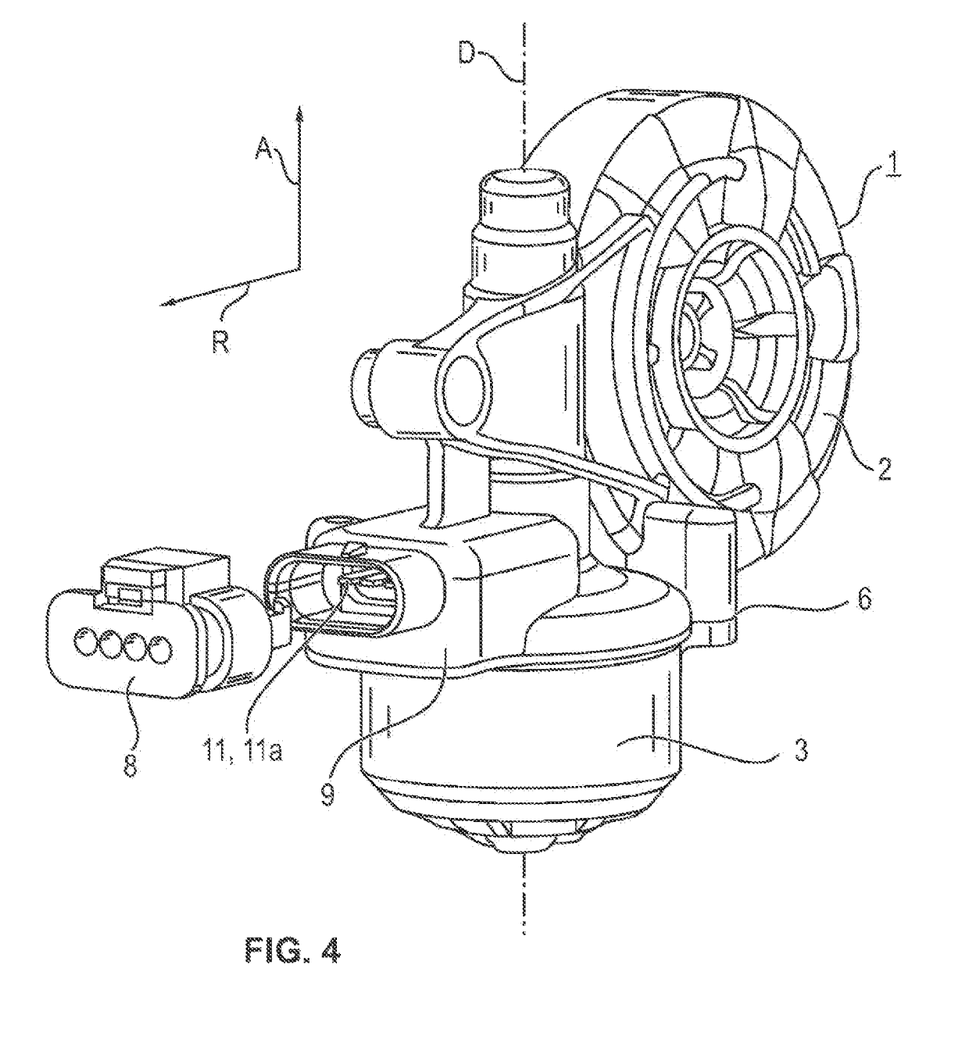
FIGS. 4 and 5 show, in different perspective views, the drive device according to FIG. 1 with a mating plug terminal arranged in the plugging direction.
Figure 5:
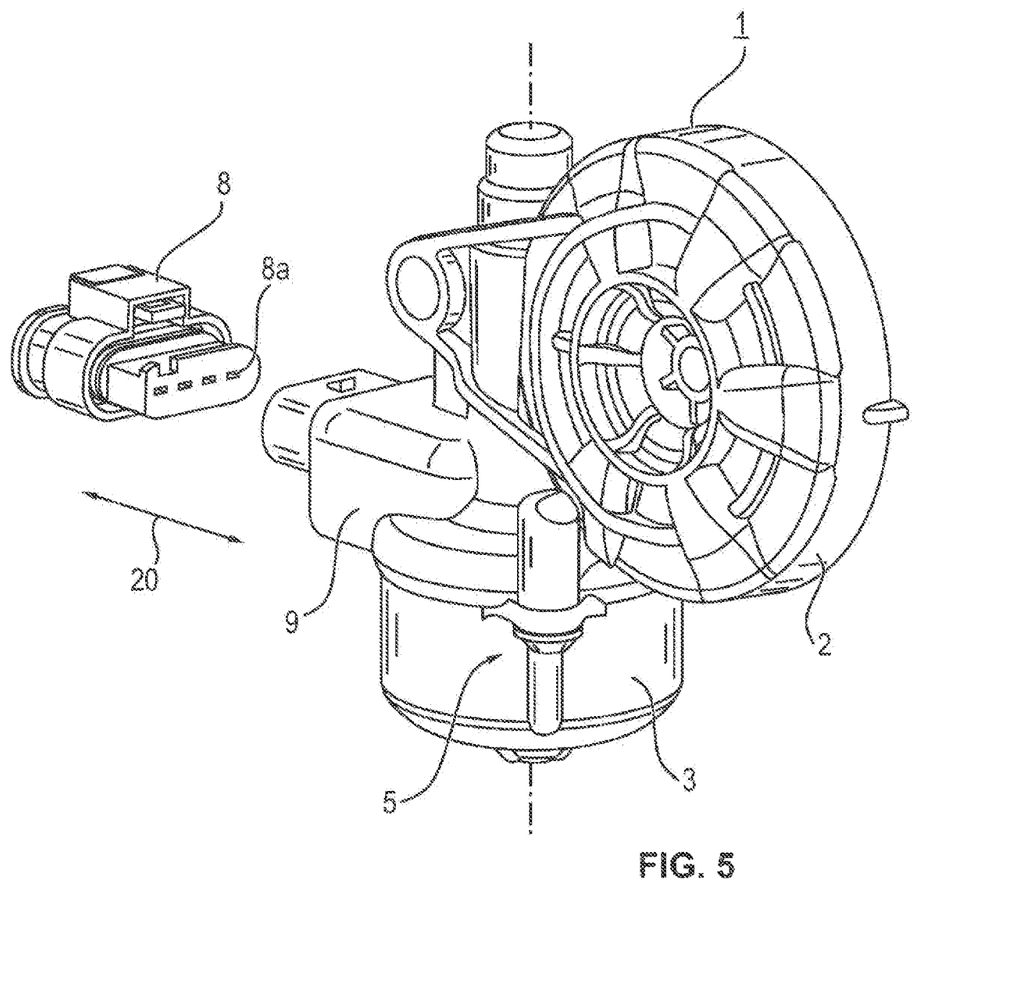

As can also be seen in FIGS. 4 to 6, in this (alternative) embodiment of the drive device 1, the plug connection between the mating plug terminal 8 and the plug terminal 10 is effected in the radial direction R (radial lateral plugging direction).

FIGS. 4 and 5 show the drive device 1 according to FIG. 1 in two different perspective views with the mating plug terminal 8 in its radially lateral plugging direction 20 with a view of the terminal pins 11a of the terminal contacts 11 (FIG. 4) or with a view of the plug-in face of the mating plug terminal 8 to the bush-like plug sockets 8a for the terminal pins 11a.

FIG. 6 shows the drive device 1 in a view according to FIG. 5 but without the transmission housing 2 and with the plug connection of the mating plug terminal 8 to the plug terminal 10 established.

As can be seen in FIG. 3, in this exemplary embodiment the plug terminal 10 has four terminal contacts 11, wherein one of the terminal contacts 11 forms three contact elements 11b. In this way, the phase terminals 12 can be interconnected inside the plug terminal 10, for example in a star or delta circuit.

As can be seen from FIGS. 2 and 6, the stator 14 is circular in cross-section. The phase terminals 12 are led to the terminal contacts 11 of the plug terminal 10, extending in an angular range of approximately 90° parallel to one another. The terminal contacts 11 of the plug terminal 10 are situated outside the stator 14 and are arranged inside the terminal block 13 along a tangential line.

FIGS. 7 to 11 show a further alternative embodiment of the drive device 1 with an axial parallel plugging direction which is indicated by the double-headed arrow 21 shown in FIG. 10.

The drive device 1 in turn has a transmission housing 2 with a plug housing 9 integrally formed thereon and a motor housing 3 with an electric motor 4 accommodated therein. The latter in turn has, according to FIG. 8, a stator 14 with the stator winding 17 in the form of the single or double coils 18 and a permanently excited rotor 16, the rotor or motor shaft 16 of which carries the worm gear 7 of the transmission, fixed with the shaft. The phase terminals 12 are in turn led in the radial direction R and may be parallel to one another in an angular range of 90°. The phase terminals 12 also electrically contact the terminal contacts 11 of the plug terminal 10.

Figure 9:
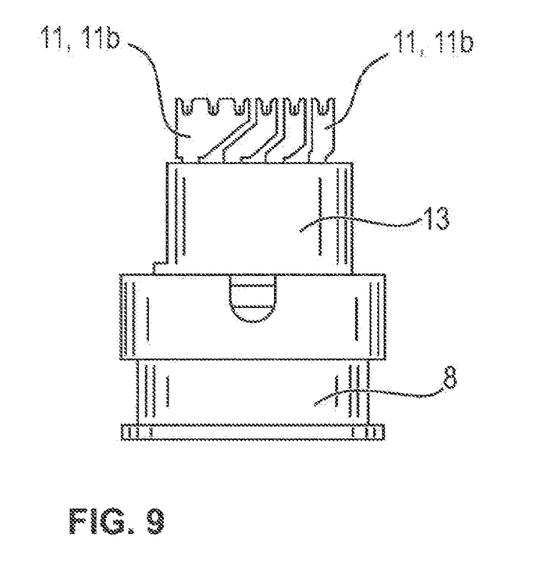
FIG. 9 shows, in a side view, the terminal block according to FIG. 8 accommodated partially (in places) by the mating plug terminal.

FIGS. 8 and 9 show an alternative embodiment of the terminal block 13 of the plug terminal 10. The contact elements 11b of the terminal contacts 11 are led axially out of the latter.

Figure 11:
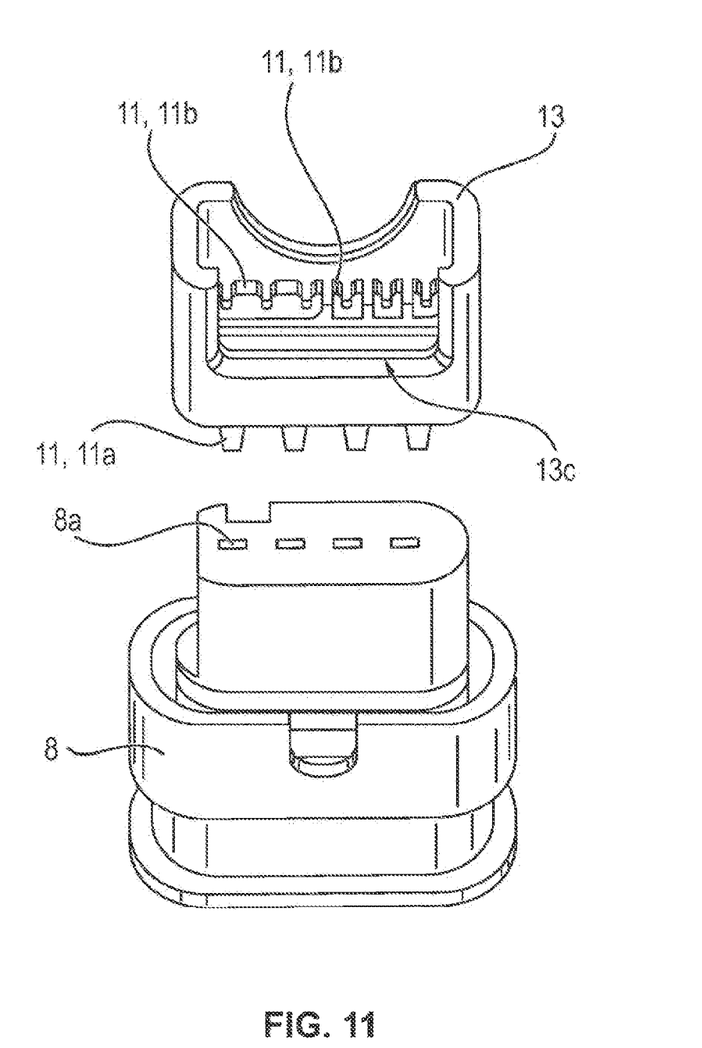
FIG. 11 shows, in an exploded view, the terminal block according to FIG. 10 and the mating plug terminal.

FIGS. 10 and 11 show a further alternative embodiment of the terminal block 13 of the plug terminal 10. It in turn has an access opening 13c for the phase terminals 12. In contrast to the terminal block 13 illustrated in FIG. 3 for the radial lateral plugging direction 20, in this embodiment according to FIGS. 10 and 11 the orientation of the contact elements 11b of the terminal contacts 11 is axial.

In both alternative embodiments of the drive device 1, the winding or wire ends of the coils 18 of the stator winding 17 are oriented axially in places and are then bent by approximately 90°, extending in the radial direction R, and oriented radially. The phase terminals 12 of the stator winding 17 are led in this radial orientation into their desired joining and contacting position P.

The claimed invention is not limited to the above-described exemplary embodiment. Instead, other alternative embodiments of the invention can also be derived by a person skilled in the art within the scope of the disclosed claims without going beyond the subject of the claimed invention. Moreover, all the individual features described in connection with the different exemplary embodiments can in particular also be combined in a different fashion within the scope of the disclosed claims without going beyond the subject of the claimed invention.

The solution described can also be employed not only in the specific application illustrated but also in a similar design for other motor vehicle applications such as, for example, for door and tailgate systems, for vehicle locks, for adjustable seat and interior systems, and for further electrical drives, control systems, sensors, and their arrangement in the vehicle.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SYMBOLS 1 drive device
2 transmission housing
3 motor housing
4 electric motor
5 flange connection
6 connection point/interface
7 worm gear
8 mating plug terminal/terminal plug
8a plug-in socket
9 plug housing
10 plug terminal
11 terminal contact
11a terminal pin
11b contact element
12 phase terminal
13 terminal block
13a plug contact side
13b connection side
13c access opening
14 stator
15 rotor housing
16 rotor
17 stator winding/rotating field winding
18 coils
19 motor/rotor shaft
20 double-headed arrow/plugging direction
21 double-headed arrow/plugging direction
A axial direction
D axis of rotation
R radial direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive device for use in a motor vehicle, the drive device comprising:
    a drive housing including a transmission housing and a motor housing connected to the transmission housing at a connection interface; and
    a brushless electric motor configured to be mounted to the drive housing, wherein the brushless electric motor includes,
    a stator provided with a stator body and a stator winding, wherein the stator body defines a central shaft passage and includes a number of external stator teeth arranged in a star formation, wherein the stator winding includes a number of phase terminals,
    a rotor provided with a number of permanent magnets, a rotor shaft, and a rotor housing, the number of permanent magnets disposed in the rotor housing, wherein the rotor is an external rotor and the rotor housing surrounding the stator body and coupled to the rotor shaft, wherein the central shaft passage is configured to receive the rotor shaft;
    a number of plug terminals including terminal contacts configured to receive a mating plug terminal,
    wherein the number of plug terminals include a plug housing integrally formed with at least one of the transmission housing and the motor housing in a region of the connection interface, wherein the plug housing is configured to receive the terminal contacts,
    wherein the terminal contacts are arranged in a terminal block defining an access opening configured to receive the phase terminals, and
    wherein the number of phase terminals are disposed in a joining and/or contacting position to electrically contact the terminal contacts of the plug terminal.

2. The drive device of claim 1, wherein the plug housing is only integrally formed with the transmission housing in the region of the connection interface.

3. The drive device of claim 1, wherein the plug housing is only integrally formed with the motor housing in the region of the connection interface.

4. The drive device of claim 1, wherein the terminal block includes a plug contact side and a connection side, wherein the terminal contacts include terminal pins, wherein the terminal pins are disposed on the plug contact side and are configured to form a plug connection to a mating contact plug, wherein the connection side opposes the plug contact side and contact elements of the terminal contacts are disposed on the plug contact side, and wherein the contact elements are configured for connection of the phase terminals.

5. The drive device of claim 4, wherein the number and arrangement of the terminal contacts of the plug terminal are configured for interconnection of the phase terminals in a star or delta circuit.

6. The drive device of claim 1, wherein the stator is circular in cross-section, and the phase terminals extend to the terminal contacts of the plug terminal extend parallel to one another and are disposed in a common angular range of 900.

7. The drive device of claim 1, wherein the terminal contacts of the plug terminal are arranged outside the stator.

8. The drive device of claim 7, wherein the terminal contacts extend in a direction tangential to the stator.

9. The drive device of claim 1, wherein the transmission housing is detachably connected to the motor housing.

10. The drive device of claim 9, wherein the motor housing or the transmission housing includes a flange connection, wherein the flange connection is configured to detachably connect the transmission housing to the motor housing.

11. The drive device of claim 10, wherein the connection interface includes the flange connection.

12. The drive device of claim 1, wherein the rotor shaft is configured to rotate about an axis of rotation and the phase terminals extend in a radial direction to the joining and/or the contacting position.

13. The drive device of claim 1, wherein the plug housing is integral to the transmission housing.

14. The drive device of claim 13, wherein the plug housing and the connection interface are disposed in a common plane.

15. A drive device for use in a motor vehicle, the drive device comprising:
    a motor housing;
    a brushless electric motor disposed in the motor housing and including a stator and a rotor, wherein the stator includes a stator body, a stator winding, and a number of phase terminals extending therefrom, wherein the rotor includes a number of permanent magnets, a rotor shaft, and a rotor housing, the number of permanent magnets disposed in the rotor housing, wherein the rotor is an external rotor and the rotor housing surrounding the stator body and coupled to the rotor shaft, wherein the central shaft passage is configured to receive the rotor shaft and the rotor shaft is configured to rotate about a rotational axis,
    a transmission housing configured to be fixed to the motor housing;
    a plug housing extending from the transmission housing in a radial direction with respect to the rotational axis; and
    a terminal contact disposed in the plug housing, wherein the number of phase terminals extend in the radial direction and are disposed between the motor housing and the transmission housing to electrically contact the terminal contact,
    wherein the number of phase connections of the stator winding are guided into a radially-oriented joining position, in which the number of phase connections extend parallel to one another.

16. The drive device of claim 15, further comprising:
    a plug terminal extending from the plug housing in an axial direction with respect to the rotational axis.

17. The drive device of claim 15, wherein the plug housing is integral with the transmission housing.

18. The drive device of claim 15, wherein the motor housing or the transmission housing includes a flange connection, wherein the flange connection is configured to detachably connect the transmission housing to the motor housing.

19. A drive device for use in a motor vehicle, the drive device comprising:
- a motor housing;
- a brushless electric motor disposed in the motor housing and including a stator and a rotor,
- wherein the rotor includes a number of permanent magnets, a rotor shaft, and a rotor housing, the number of permanent magnets disposed in the rotor housing, configured to rotate about a rotational axis,
- wherein the stator includes a stator body and a stator winding, wherein the stator body defines a central shaft passage and includes a number of external stator teeth arranged in a star formation, wherein the central shaft passage is configured to receive the rotor shaft and the rotor is an external rotor and the rotor housing surrounds the stator body and is coupled to the rotor shaft, wherein the stator winding includes a number of phase terminals;
- a transmission housing configured to be fixed to the motor housing;
- a plug housing extending from the motor housing in a radial direction with respect to the rotational axis; and
- a terminal contact disposed in the plug housing, wherein the number of phase terminals extend in the radial direction and are disposed between the motor housing and the transmission housing to electrically contact the terminal contact.

\* \* \* \* \*